United States Patent
Kolar et al.

(10) Patent No.: US 9,212,914 B2
(45) Date of Patent: Dec. 15, 2015

(54) EVENT-BASED LOCATION SAMPLING FOR MAP-MATCHING

(71) Applicant: International Business Machines Corporation, Armonk, NY (US)

(72) Inventors: Vinay K. Kolar, Bangalore (IN); Ravindranath Kokku, Bangalore (IN); Venkatadheeraj Pichapati, Bangalore (IN)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 76 days.

(21) Appl. No.: 13/973,517

(22) Filed: Aug. 22, 2013

(65) Prior Publication Data

US 2015/0057930 A1    Feb. 26, 2015

(51) Int. Cl.
*G01C 21/00*    (2006.01)
*G01C 21/16*    (2006.01)
*G01C 21/20*    (2006.01)
*G01C 21/30*    (2006.01)

(52) U.S. Cl.
CPC .............. *G01C 21/165* (2013.01); *G01C 21/00* (2013.01); *G01C 21/20* (2013.01); *G01C 21/30* (2013.01)

(58) Field of Classification Search
CPC ......... B28C 5/422; G01C 21/20; G01C 21/30
USPC ......................... 701/532, 454, 447, 433, 533; 455/456.1, 456.5
See application file for complete search history.

(56) References Cited

U.S. PATENT DOCUMENTS

| | | | | |
|---|---|---|---|---|
| 5,884,216 | A * | 3/1999 | Shah .................. | G01C 21/3446 340/995.1 |
| 6,034,635 | A * | 3/2000 | Gilhousen ............. | H04W 64/00 342/457 |
| 6,108,603 | A * | 8/2000 | Karunanidhi .......... | G01C 21/30 701/532 |
| 6,195,046 | B1 * | 2/2001 | Gilhousen ............. | H04W 64/00 342/387 |
| 6,611,755 | B1 * | 8/2003 | Coffee .................... | B28C 5/422 340/438 |
| 7,688,349 | B2 * | 3/2010 | Flickner ............. | G06K 9/00362 348/150 |

(Continued)

FOREIGN PATENT DOCUMENTS

WO    2011107652    9/2011

OTHER PUBLICATIONS

Zheng et al. Reducng Uncertainty of Low-Sampling-Rate Trajectories. Proceedings of the 2012 IEEE 28th International Conference on Data Engineering, Apr. 2012.

(Continued)

*Primary Examiner* — Thomas G Black
*Assistant Examiner* — Wae Louie
(74) *Attorney, Agent, or Firm* — Ryan, Mason & Lewis, LLP

(57) ABSTRACT

Methods, systems, and articles of manufacture for event-based location sampling for map-matching are provided herein. A method includes determining a location of an object via a device associated with the object; determining one or more temporal sampling periods of one or more location information sensors at one or more sampling regions based on (i) said location of the object and (ii) one or more items of map-matching information; capturing one or more motion-related events associated with the object via the one or more location information sensors during the determined one or more temporal periods; and generating a trajectory of the object based on the one or more captured motion-related events.

20 Claims, 7 Drawing Sheets

(56) References Cited

U.S. PATENT DOCUMENTS

| | | | | |
|---|---|---|---|---|
| 8,204,684 | B2* | 6/2012 | Forstall | G01C 21/20 455/456.1 |
| 8,362,949 | B2* | 1/2013 | Yang | G01S 19/34 342/357.31 |
| 8,719,198 | B2* | 5/2014 | Zheng | G01C 21/20 706/21 |
| 8,861,353 | B2* | 10/2014 | Duan et al. | 370/230.1 |
| 2005/0134440 | A1* | 6/2005 | Breed | B60N 2/2863 340/435 |
| 2011/0208426 | A1* | 8/2011 | Zheng | G01C 21/30 701/532 |
| 2011/0208429 | A1* | 8/2011 | Zheng | G01C 21/3484 701/533 |
| 2011/0215903 | A1 | 9/2011 | Yang et al. | |
| 2011/0313648 | A1* | 12/2011 | Newson | G01C 21/3484 701/447 |
| 2014/0114556 | A1* | 4/2014 | Pan | G08G 1/00 701/119 |
| 2015/0057930 | A1* | 2/2015 | Kolar | G01C 21/165 701/532 |

OTHER PUBLICATIONS

Fang et al. Energy-efficient GPS Trajectory Data Acquisition Based on Improved Map Matching. ACM SIGSPATIAL GIS '11, Nov. 1-4, 2011.

Raymond et al. Map matching with Hidden Markov Model on sampled road network. 21st International Conference on Pattern Recognition (ICPR 2012), Nov. 11-15, 2012. Tsukuba, Japan.

Thiagarajan et al. "Accurate, Low-Energy Trajectory Mapping for Mobile Devices," NSDI 2011.

Newson et al. "Hidden markov map matching through noise and sparseness," ACM SIGSPATIAL GIS 2009.

Thiagarajan et al., "Vtrack: accurate, energy-aware road traffic delay estimation using mobile phones," ACM SenSys 2009.

Goh, et al, "Online map-matching based on hidden markov model for real-time traffic sensing applications." ITSC 2012.

Lou et al. "Map-matching for low-sampling-rate GPS trajectories," ACM SIGSPATIAL GIS 2009.

\* cited by examiner

EVENT-BASED LOCATION SAMPLING FOR MAP-MATCHING

FIELD OF THE INVENTION

Embodiments of the invention generally relate to information technology, and, more particularly, to map-related technology.

BACKGROUND

Existing map-matching approaches face challenges in performing online trajectory identification. Such approaches utilize algorithms that are energy-inefficient to and/or inaccurate. For example, approaches that include a high global positioning system (GPS) sampling rate lead to redundant GPS points for use in an algorithm, resulting in energy wastage. Conversely, approaches that include a low GPS sampling rate lead to insufficient GPS points for use in an algorithm, resulting in low accuracy levels.

Accordingly, a need exists for location sampling techniques for map-matching in coordination with requirements of a given matching algorithm.

SUMMARY

In one aspect of the present invention, techniques for event-based location sampling for map-matching are provided. An exemplary computer-implemented method can include steps of determining a location of an object via a device associated with the object; determining one or more temporal sampling periods of one or more location information sensors at one or more sampling regions based on (i) said location of the object and (ii) one or more items of map-matching information; capturing one or more motion-related events associated with the object via the one or more location information sensors during the determined one or more temporal periods; and generating a trajectory of the object based on the one or more captured motion-related events.

In another aspect of the invention, an exemplary computer-implemented method can include steps of determining a location of an object via a mobile device associated with the object, and determining one or more temporal sampling periods and one or more location information sensors at one or more sampling regions based on (i) said location of the object and (ii) one or more items of map-matching information. The method additionally includes capturing location information associated with the object via the one or more location information sensors during the determined one or more temporal periods, and implementing event detection logic in conjunction with the captured location information to generate a trajectory of the object.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for event-based location sampling for efficient map-matching. As detailed herein, at least one embodiment of the invention includes turning-on and/or activating location sampling at points and/or locations that facilitate map-matching. Additionally, the techniques described herein can be implemented in offline as well as online map-matching embodiments.

As used herein, "map-matching" refers to a technique wherein given a sequence of location points of a moving object, the trajectory that the object travelled is determined. As such, at least one embodiment of the invention includes map-matching wherein a user's location is collected from a device associated with the user (for example, a smart phone), and this location information is sent to a map-matching algorithm (which can reside, for instance, on a networked server).

As further detailed herein, in at least one embodiment of the invention, location information is sampled at points and/or locations that are of interest to a given map-matching algorithm. Such points of interest might include, for example, a location at which an object turns, an uninterrupted stretch of road, an intersection, etc. Additionally, one or more such events can be detected by low-power sensors on one or more devices. For instance, accelerometer samples can determine turns or long stretches of uninterrupted road.

Figure 1:
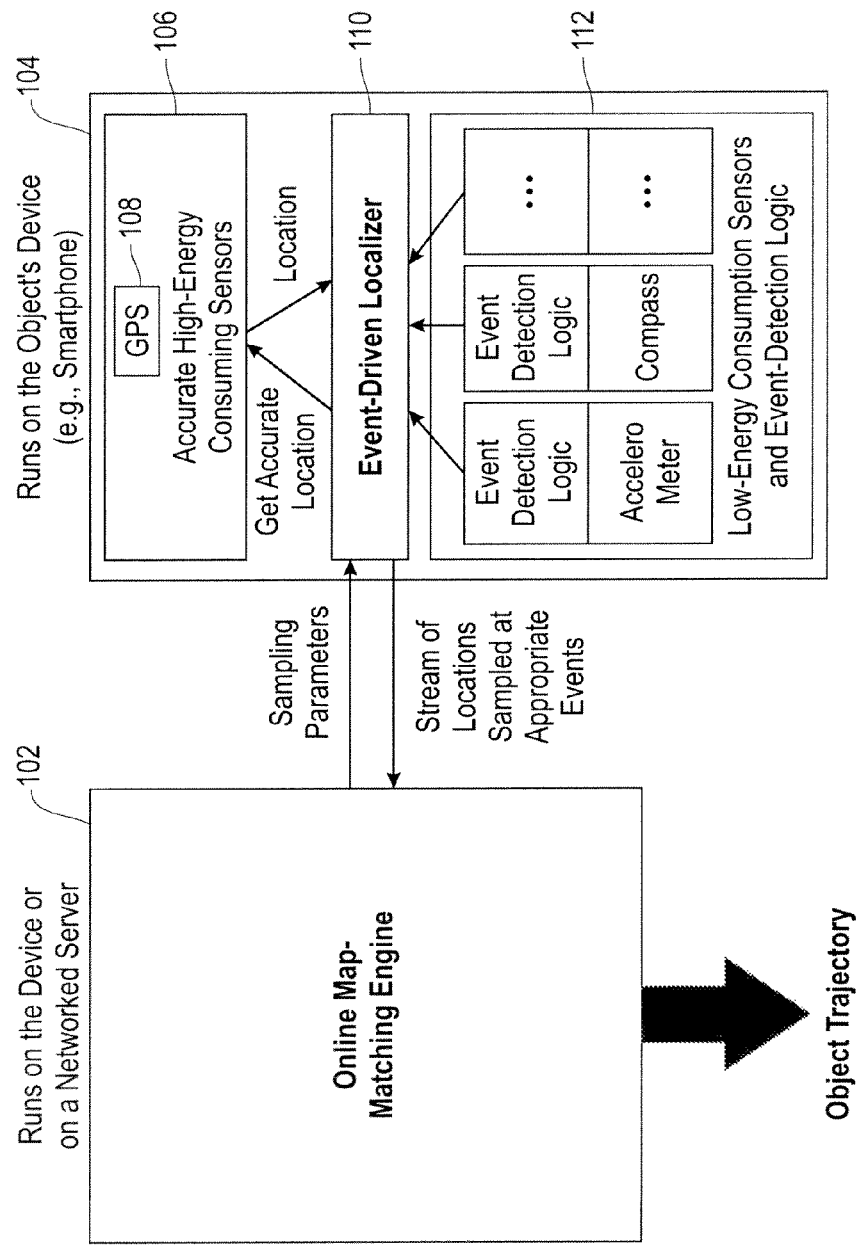
FIG. 1 is a block diagram illustrating an example embodiment, according to an aspect of the invention.

FIG. 1 is a block diagram illustrating an example embodiment, according to an aspect of the invention. By way of illustration, FIG. 1 depicts an online map-matching (MM) engine 102 which requests a stream of location samples from a given object or user for map-matching. The MM engine 102 can run, for example, on a user device and/or on a networked server. Additionally, the MM engine 102 uses the stream of location information to update the trajectory of the given object or user.

The event-driven localizer component 110 coordinates the transmission of location information to the MM engine 102. Accordingly, the event-driven localizer component 110 can acquire and/or capture types of information such as location estimates of the object from component 106, and information on when to estimate the location (from components 112 and 102). This component (component 110) contains logic for deciding when to sample and when to transmit the information to the component 102.

Location information can be sampled via a component 104 on the user device (for example, a smart-phone) via trigger sensors, which include low-accuracy, low-energy sensors 112 at a client-level, or map-matching engine triggers. Such sensors 112 detect various motion-related events, and can include, for example, an accelerometer, a gyroscope, a compass, etc. Each sensor also incorporates and implements event detection logic that detects events of interest for a given map-matching algorithm. By way merely of example, event detection logic of an accelerometer detects location information if the object or user moved, the object or user stopped moving, the object or user accelerated or decelerated, etc.

Component 104 additionally includes one or more sampling sensors 106 which include high-accuracy location sensing sensors. Such sensors 106 can sample an object's (or a user's) current location, for example, via obtaining relevant latitude and longitude coordinates. By way of example, such sensors can include a GPS sensor 108.

Component 112 represents additional, possibly low-energy-consuming, sensors. The sensors in component 112 assist in deciding when to trigger location sampling from accurate location sensors present in component 106. For example, an accelerometer sensor can send a trigger to the event-driven localizer component 110. The sensors in component 112 may also assist in predicting a possible location of the object by, for example, using previously sampled locations and sensor values. For instance, an accelerometer sensor may estimate approximate location by combining the observed acceleration and direction values sensed since a previous location sampling. By way of example, these sensors can include an accelerometer, a compass, a gyroscope, or any sensor that can detect events such as changes in the direction of the object.

Location information, such as location estimates and localization triggers sampled via sensors 112 and 106, is transmitted to an event-driven localizer component 110, which ultimately provides the map-matching engine 102 with the above-noted stream of location information. Location information provided by sensors 112 and/or 106 to the event-driven localizer component 110 can include individual location information and/or buffered or aggregate location information, as further detailed in connection with FIG. 5.

An example embodiment of the invention implemented via components such as those depicted in FIG. 1 can include the use of sampling triggers, which determine the times and/or locations at which a sample is to be captured via device sensors (such as sensors 112 and/or 106) and/or the MM engine 102. For example, a sensor trigger can include the use of a compass, which can publish an event when the object turns onto or off of a road. In an example embodiment of the invention, movement of greater than a threshold number of degrees in x seconds can trigger such an event. Additionally, a sensor trigger can also include the user of an accelerometer, which can publish an event when the object stops, accelerates or decelerates. Threshold-based methods can also be used to tune such event publishing. Such an event may indicate, for example, that object stopped at a critical point such as prior to turning, as well as indicate, for instance, that a continuous acceleration can generally represent that the object is travelling on the same road.

Also, the MM engine 102 can determine the regions wherein sampling is desirable. Such a region can be identified, for example, if data sampled in this region lead to low-processing for computing trajectory by the given map-matching algorithm. A map-matching algorithm, in at least one embodiment of the invention, can include the steps of determining one or more nearest road segments (to the object in question) and computing a multi-source-destination shortest path. Determining one or more nearest road segments can include identifying roads that are less than or equal to x meters (or miles, feet, etc.) from a given location sample. Multi-source-destination shortest path computation can include computing the shortest path between all nearest road-segments at sample t, and all nearest road-segments at sample (t+1). Accordingly, the amount of processing can be a function of the number of nearest road segments.

Additionally, MM engine logic to compute where to sample can include computing a spatial box of two types of regions, namely, certainty regions and ambiguity regions. As used herein, a spatial box is a region on the map (represented with polygons or circles). Additionally, certainty regions and ambiguity regions can be marked as two types of spatial boxes on the map. As used herein, certainty regions refer to regions wherein sampling data leads to low-processing via a map-matching algorithm (for example, such locations would have fewer nearby roads, and hence, sampling GPS in such locations will reduce the time taken for map-matching).

Figure 2:
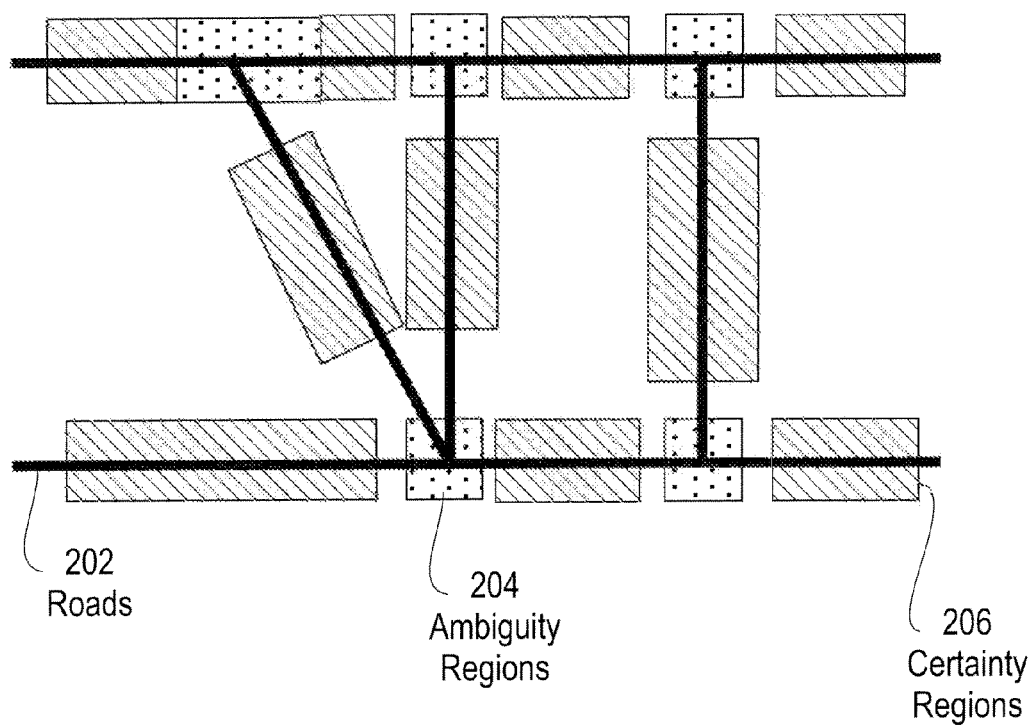
FIG. 2 is a block diagram illustrating an example embodiment for detecting favorable and/or non-favorable regions for sampling, according to an aspect of the invention.

By way of illustration, consider FIG. 2, which is a block diagram illustrating an example embodiment for detecting favorable and/or non-favorable regions for sampling, according to an aspect of the invention. By way of illustration, FIG. 2 depicts roads 202, ambiguity regions 204 and certainty regions 206. For example, a certainty region might include a box positioned around a set of straight road segments with no intersections. Ambiguity regions, as used herein, refer to regions wherein sampling data can lead to large amounts of processing via a map-matching algorithm (such as regions where multiple roads intersect). At least one embodiment of the invention can include transmitting nearby certainty and ambiguity regions to a client application on the client device, wherein the client may only sample in the certainty regions.

Additionally, at least one embodiment of the invention includes the use of hybrid triggers, which utilizes sensor triggers and MM engine triggers to activate sampling. By way of example, an MM engine can push the nearby certainty and ambiguity regions to the client application on the client device, and the sensors (a compass, accelerometer gyroscope, etc.) can recognize when the object has performed an event (such as turning, for example).

Figure 3:
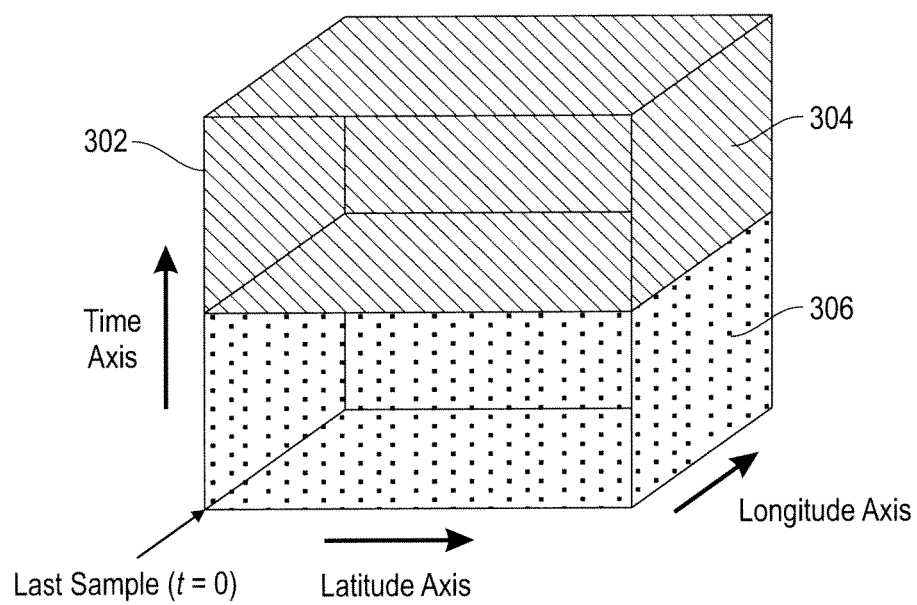
FIG. 3 is a block diagram illustrating an example embodiment for spatio-temporal sampling, according to an aspect of the invention.

A hybrid trigger approach can also include creating a space-time box—instead of a spatial box—for a given sample. A space-time box contains the time dimension along with the spatial region. For example, consider FIG. 3, which is a block diagram illustrating an example embodiment for spatio-temporal sampling, according to an aspect of the invention. By way of illustration, FIG. 3 depicts a space-time box illustrated by a cube 302 where the axes represent latitude, longitude and time. FIG. 3 also depicts section 304, which indicates that the location in the 304 space-time box is to be sampled because the time of the last sample is too old.

Additionally, section 306 indicates a space-time box that is not to be sampled because the spatial region is an ambiguity region.

Hence, it can be estimated if the object is within or outside of a space-time box. Accordingly, an object is within the space-time box if the object is within the spatial region and if the current time is within the time bounds of the space-time box. Such an approach includes extending space-boxes by adding constraints on when to sample. By way of example, a determination can be made to not sample if the previous sampling was less than t seconds ago, even if the spatial region is a certainty region, or a determination can be made to sample if the previous sample is more than t seconds ago, even when the spatial region is an ambiguity region.

Figure 4:
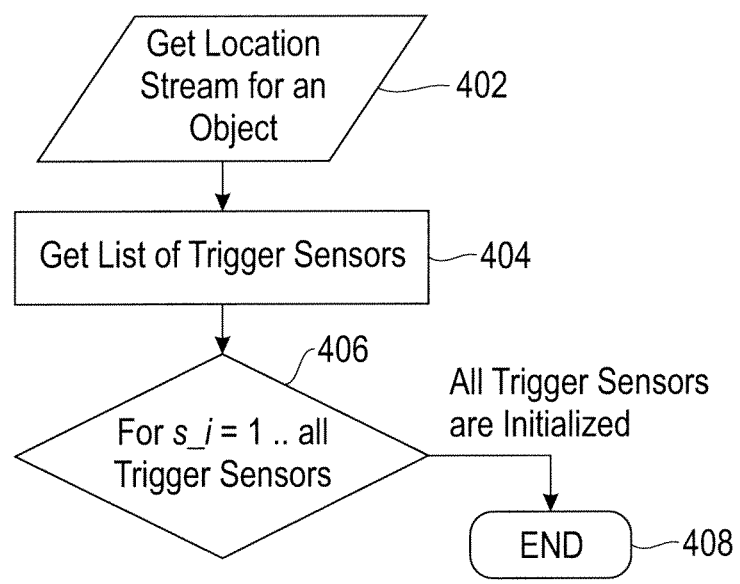
FIG. 4 is a flow diagram illustrating techniques for associating different event detection logic to different sensors, according to an embodiment of the invention.

FIG. 4 is a flow diagram illustrating techniques for associating different event detection logic to different sensors, according to an embodiment of the invention. Step 402 includes obtaining a location stream for an object. Step 404 includes obtaining a list of trigger sensors. Note also that, in at least one embodiment of the invention, the trigger sensors can include MM engine triggers including certainty and ambiguity regions. Step 406 includes initializing all trigger sensors present (wherein s_i indicates the index of a sensor). Each trigger sensor can be initialized with its own logic. For example, a compass sensor can be initialized to trigger a location request to the event-driven localizer component 110 of FIG. 1 if the sensor perceives that the object's direction has to changed beyond a threshold amount. If all trigger sensors are initialized, the techniques depicted in FIG. 4 proceed to end at step 408.

Figure 5:
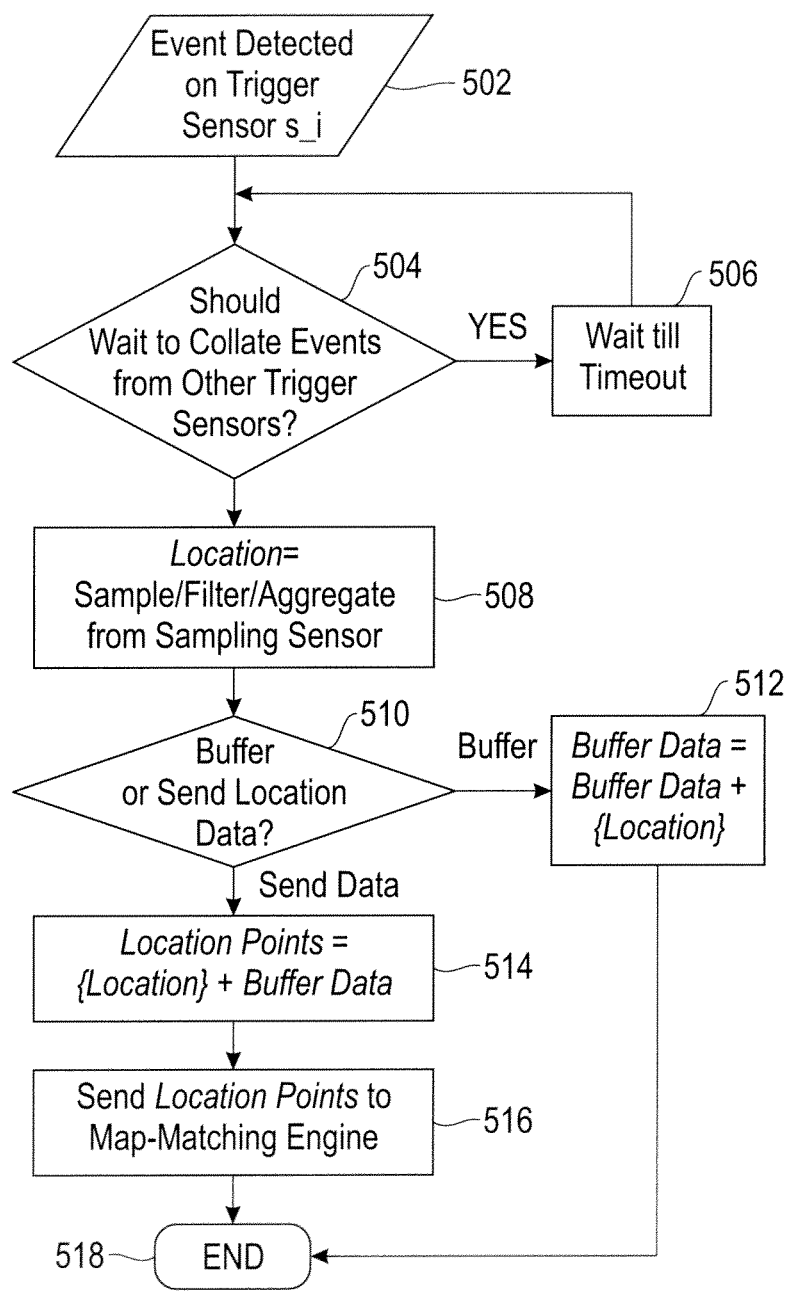
FIG. 5 is a flow diagram illustrating techniques for buffering and sending sampled data at an event-driven localizer component (such as depicted as component 110 in FIG. 1), according to an embodiment of the invention.

FIG. 5 is a flow diagram illustrating techniques for buffering and sending sampled data at an event-driven localizer component (such as depicted as component 110 in FIG. 1), according to an embodiment of the invention. Step 502 includes detecting an event on a trigger sensor (each sensor i is indexed by s_i). The event-driven localizer collects the triggers from each sensor (via step 502) and maintains a history of the recently observed events. Additionally, the event-driven localizer decides if the history of events should trigger a location sample (triggering sensors in component 106 in FIG. 1 for location estimates). This decision may be made based on suitable techniques using a decision tree or other suitable techniques. For example, the event-driven localizer may decide to trigger a location sampling if the object is perceived to be in a certainty region (based on information received from online map-matcher engine) and if a compass indicates that the object has taken a turn.

Step 504 of FIG. 5 includes determining if the system should wait to collate events from other trigger sensors. If yes (that is, the system should wait), then the system waits in step 506 until a timeout. If no (that is, the system should not wait), step 508 includes determining a location from the sampling sensor.

The event-driven localizer may use techniques to trigger location sampling, but decide to transmit the current location based on recently observed events. For example, if the compass sensor indicates that the object has turned, but the current location of the object is unknown (and hence, the event-driven localizer does not know if the object is presently in a certainty region or an ambiguity region), the event-driven localizer may trigger GPS sampling. If the event-driven localizer perceives that the object is in an ambiguity region, the component may not send the data to the online map-matching engine. Instead, the event-driven localizer can estimate when the object will be in the certainty region (based on movement information and certainty/ambiguity region information), and decide to sample and send the location at that point of time. In doing so, the event-driven localizer is filtering the samples that are not sent to the online map-matching engine, as carried out via step 508 in FIG. 5.

In at least one embodiment of the invention, the event-driven localizer can also buffer a set of sample points (for example, if the sampling interval is too small), and send the buffered data collectively to the online-map-matching engine. Step 510 includes determining whether to buffer or send the location data to the MM engine. If the decision is made to buffer the location data, step 512 includes buffering the data along with the identified location and ending the technique at step 518. If the decision is made to send the data, step 514 includes determining one or more location points, which includes the identified location as well as any buffered data. Further, step 516 includes sending the location points to the map-matching engine and ending the technique at step 518.

In another embodiment, the event-driven localizer can also aggregate the data. For example, if the object seems to have stopped temporarily (for example, at a traffic red-light) but GPS samples were taken during that time, instead of sending information from all of the locations, the event-driven localizer can summarize one location information and send that information to the online map-matching engine.

At least one embodiment of the invention can also include a feedback-based map-matching system, which includes adapting a map-matching algorithm and sampling sensors (for example, GPS sampling sensors) to create a feedback loop. The feedback loop is created when the event-driven localizer transmits a set of location points to the online map-matching engine, and the engine determines—based on the history of recent points of the object—certainty and ambiguity regions near the current location of the object, or the regions near the locations where the object is predicted to be heading. This prediction can be based on the historical trajectories of other users that have traveled along similar locations as the object has traveled and/or based on previous trajectories of the object itself. When the event-driven localizer gets such feedback, it incorporates the new regions of certainty and ambiguity that it is required to sample.

Figure 6:
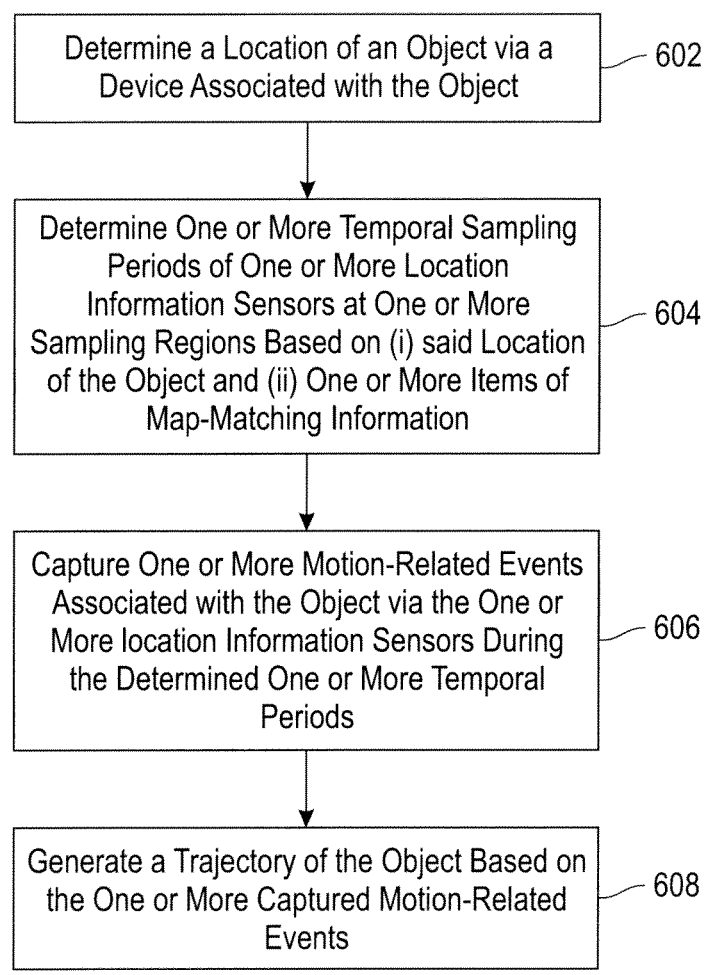
FIG. 6 is a flow diagram illustrating techniques according to an embodiment of the invention.

FIG. 6 is a flow diagram illustrating techniques according to an embodiment of the invention. Step 602 includes determining a location of an object via a device associated with the object. The device associated with the object can include, by way of example, a smart phone.

Step 604 includes determining one or more temporal sampling periods of one or more location information sensors at one or more sampling regions based on (i) said location of the object (for example, a set of latitude and longitude coordinates associated with the object) and (ii) one or more items of map-matching information. This step can include, for example, identifying the one or more sampling regions through map-analysis as well as identifying the one or more sampling regions and based on one or more errors obtained with previous data points and/or trajectories.

Additionally, as detailed herein, the one or more sampling regions can correspond to one or more points and/or locations of interest to a given map-matching algorithm. Also, in at least one embodiment of the invention, determining the one or more temporal sampling periods includes identifying one or more of the one or more location information sensors that surpass a given threshold for a given parameter. Further, as noted herein, the location information sensors can include a global positioning system sensor, an accelerometer, a gyroscope and/or a compass.

Step 606 includes capturing one or more motion-related events associated with the object via the one or more location information sensors during the determined one or more temporal periods. Step 608 includes generating a trajectory of the object based on the one or more captured motion-related events.

Further, the techniques depicted in FIG. 6 can additionally include adapting a map-matching algorithm with the one or more location information sensors to create a feedback loop.

Additionally, at least one embodiment of the invention includes determining a location of an object via a mobile device associated with the object, and determining one or more temporal sampling periods and one or more location information sensors at one or more sampling regions based on (i) said location of the object and (ii) one or more items of map-matching information. Such an embodiment also includes capturing location information associated with the object via the one or more location information sensors during the determined one or more temporal periods, and implementing event detection logic in conjunction with the captured location information to generate a trajectory of the object.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 7:
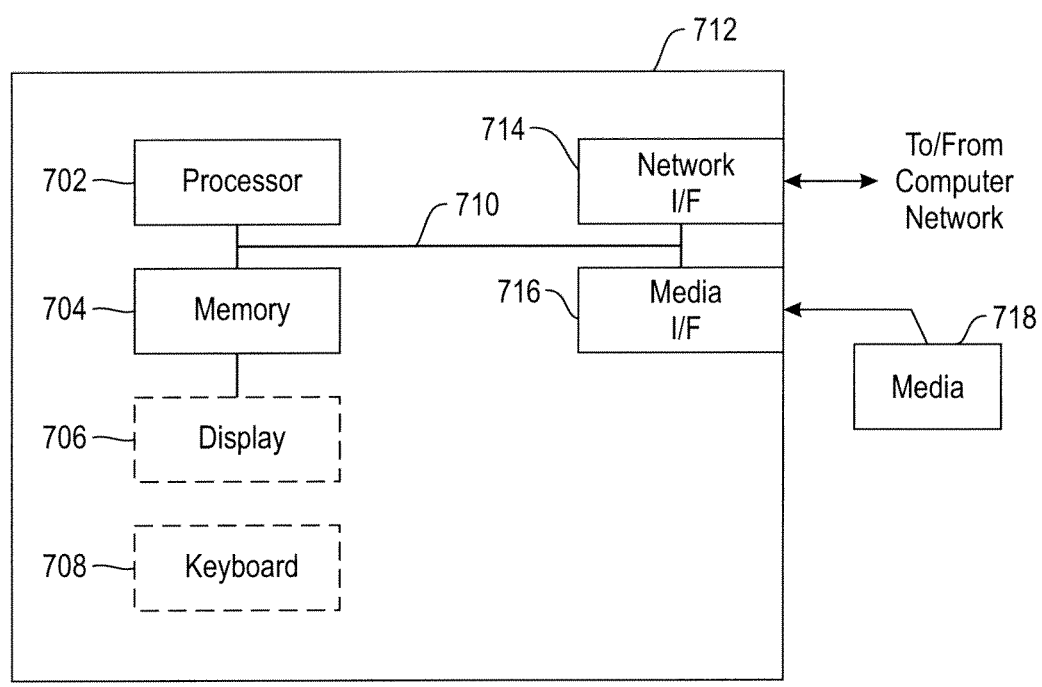
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present) invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining a user's location from a device and leveraging the location information via a map-matching algorithm.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining a location of an object via a device associated with the object;
   determining a plurality of sampling parameters for generating a trajectory of the object, wherein the plurality of sampling parameters comprises at least:
   (i) identification of one or more particular location information sensors, from a set of multiple location information sensors resident on the device associated with the object, to be used for capturing one or more motion-related events associated with the object;
   (ii) identification of one or more particular sampling regions, from a set of multiple sampling regions, within which the one or more particular location information sensors resident on the device are to capture one or more motion-related events associated with the object; and
   (iii) identification of a given temporal period, from a set of multiple temporal periods, during which the one or more particular location information sensors resident on the device are to capture one or more motion-related events associated with the object; and
   wherein said determining the plurality of sampling parameters is based on (i) said location of the object and (ii) one or more items of map-matching information;
   transmitting the determined plurality of sampling parameters to the device associated with the object;
   obtaining one or more motion-related events associated with the object captured by the one or more particular location information sensors resident on the device in accordance with the determined plurality of sampling parameters; and
   generating a trajectory of the object based on the one or more captured obtained motion-related events;
   wherein the steps are carried out by at least one computing device.

2. The method of claim 1, wherein said determining the given temporal period comprises identifying the one or more particular sampling regions through map-analysis.

3. The method of claim 1, wherein said determining the given temporal period comprises identifying the one or more particular sampling regions based on one or more errors obtained with previous data points and/or trajectories.

4. The method of claim 1, wherein said one or more particular sampling regions correspond to one or more points and/or locations of interest to a given map-matching algorithm.

5. The method of claim 1, wherein said determining the given temporal period comprises identifying at least one of the one or more particular location information sensors that surpass a given threshold for a given parameter.

6. The method of claim 1, wherein said one or more particular location information sensors comprise at least a global positioning system sensor.

7. The method of claim 1, wherein said one or more particular location information sensors comprise at least an accelerometer.

8. The method of claim 1, wherein said one or more particular location information sensors comprise at least a gyroscope.

9. The method of claim 1, wherein said one or more particular location information sensors comprise at least a compass.

10. The method of claim 1, wherein said location of the object comprises a set of latitude and longitude coordinates associated with the object.

11. The method of claim 1, comprising:
    adapting a map-matching algorithm with the one or more particular location information sensors to create a feedback loop.

12. The method of claim 1, wherein said device associated with the object comprises a smart phone.

13. An article of manufacture comprising a computer readable storage medium having computer readable instructions tangibly embodied thereon which, when implemented, cause a computer to carry out a plurality of method steps comprising:
    obtaining a location of an object via a device associated with the object;
    determining a plurality of sampling parameters for generating a trajectory of the object, wherein the plurality of sampling parameters comprises at least:
    (i) identification of one or more particular location information sensors, from a set of multiple location information sensors resident on the device associated with the object, to be used for capturing one or more motion-related events associated with the object;
    (ii) identification of one or more particular sampling regions, from a set of multiple sampling regions within which the one or more particular location information sensors resident on the device are to capture one or more motion-related events associated with the object; and
    (iii) identification of a given temporal period, from a set of multiple temporal periods, during which the one or more particular location information sensors resident on the device are to capture one or more motion-related events associated with the object; and
    wherein said determining the plurality of sampling parameters is based on (i) said location of the object and (ii) one or more items of map-matching information;
    transmitting the determined plurality of sampling parameters to the device associated with the object;
    obtaining one or more motion-related events associated with the object captured by the one or more particular location information sensors resident on the device in accordance with the determined plurality of sampling parameters; and generating a trajectory of the object based on the one or more obtained motion-related events.

14. The article of manufacture of claim 13, wherein said one or more particular sampling regions correspond to one or more points and/or locations of interest to a given map-matching algorithm.

15. The article of manufacture of claim 13, wherein said determining the given temporal period comprises identifying at least one of the one or more particular location information sensors that surpass a given threshold for a given parameter.

16. The article of manufacture of claim 13, wherein the method steps comprise:
adapting a map-matching algorithm with the one or more particular location information sensors to create a feedback loop.

17. A system comprising:
a memory; and
at least one processor coupled to the memory and configured for:
obtaining a location of an object via a device associated with the object;
determining a plurality of sampling parameters for generating a trajectory of the object, wherein the plurality of sampling parameters comprises at least:
(i) identification of one or more particular location information sensors, from a set of multiple location information sensors resident on the device associated with the object, to be used for capturing one or more motion-related events associated with the object;
(ii) identification of one or more particular sampling regions, from a set of multiple sampling regions, within which the one or more particular location information sensors resident on the device are to capture one or more motion-related events associated with the object; and
(iii) identification of a given temporal period, from a set of multiple temporal periods, during which the one or more particular location information sensors resident on the device are to capture one or more motion-related events associated with the object; and
wherein said determining the plurality of sampling parameters is based on (i) said location of the object and (ii) one or more items of map-matching information;
transmitting the determined plurality of sampling parameters to the device associated with the object;
obtaining one or more motion-related events associated with the object captured by the one or more particular location information sensors resident on the device in accordance with the determined plurality of sampling parameters; and
generating a trajectory of the object based on the one or more obtained motion-related events.

18. A method comprising:
obtaining a location of an object via a device associated with the object;
determining a plurality of sampling parameters for generating a trajectory of the object, wherein the plurality of sampling parameters comprises at least:
(i) identification of one or more particular location information sensors, from a set of multiple location information sensors resident on the device associated with the object, to be used for capturing one or more motion-related events associated with the object;
(ii) identification of one or more particular sampling regions, from a set of multiple sampling regions, within which the one or more particular location information sensors resident on the device are to capture one or more motion-related events associated with the object; and
(iii) identification of a given temporal period, from a set of multiple temporal periods, during which the one or more particular location information sensors resident on the device are to capture one or more motion-related events associated with the object; and
wherein said determining the plurality of sampling parameters is based on (i) said location of the object and (ii) one or more items of map-matching information;
transmitting the determined plurality of sampling parameters to the device associated with the object;
obtaining location information associated with the object captured by the one or more particular location information sensors resident on the device in accordance with the determined plurality of sampling parameters; and
implementing event detection logic in conjunction with the obtained location information to generate a trajectory of the object.

19. The method of claim 18, wherein said determining the one or more particular location information sensors comprises identifying one or more of the one or more location information sensors that surpass a given threshold for a given parameter.

20. The method of claim 18, comprising:
adapting a map-matching algorithm with the one or more particular location information sensors to create a feedback loop.

* * * * *